US010184446B1

United States Patent
Schuff

(10) Patent No.: US 10,184,446 B1
(45) Date of Patent: Jan. 22, 2019

(54) WIND TURBINE SYSTEM

(71) Applicant: David A Schuff, Surprise, AZ (US)

(72) Inventor: David A Schuff, Surprise, AZ (US)

( * ) Notice: Subject to any disclaimer, the term of this patent is extended or adjusted under 35 U.S.C. 154(b) by 0 days.

(21) Appl. No.: 15/987,806

(22) Filed: May 23, 2018

(51) Int. Cl.
| | |
|---|---|
| *F03D 9/00* | (2016.01) |
| *H02P 9/04* | (2006.01) |
| *F03D 1/04* | (2006.01) |
| *F03D 9/25* | (2016.01) |
| *F03D 7/02* | (2006.01) |
| *H02K 7/18* | (2006.01) |

(52) U.S. Cl.
CPC .............. *F03D 1/04* (2013.01); *F03D 7/0224* (2013.01); *F03D 9/25* (2016.05); *H02K 7/183* (2013.01); *F05B 2220/706* (2013.01); *F05B 2240/121* (2013.01); *F05B 2240/131* (2013.01); *F05B 2240/211* (2013.01); *F05B 2270/321* (2013.01); *F05B 2280/6001* (2013.01); *H02K 2201/12* (2013.01)

(58) Field of Classification Search
CPC ............ F03D 1/04; F03D 9/25; F03D 7/0224; H02K 7/183
See application file for complete search history.

(56) References Cited

U.S. PATENT DOCUMENTS

| | | | | |
|---|---|---|---|---|
| 4,017,205 A | | 4/1977 | Bolie | |
| 4,031,173 A | * | 6/1977 | Rogers | F03D 3/067 261/24 |
| 4,031,405 A | * | 6/1977 | Asperger | F03D 3/0472 290/55 |
| 4,036,916 A | * | 7/1977 | Agsten | F03D 1/04 261/109 |
| 4,086,498 A | | 4/1978 | Szoeke | |
| 4,116,581 A | * | 9/1978 | Bolie | F03D 1/04 415/4.4 |
| 4,154,556 A | * | 5/1979 | Webster | F03D 1/04 415/4.4 |
| 4,218,175 A | | 8/1980 | Carpenter et al. | |
| 4,452,046 A | * | 6/1984 | Valentin | F03D 1/04 60/641.11 |
| 4,508,973 A | * | 4/1985 | Payne | F03D 1/04 290/55 |

(Continued)

FOREIGN PATENT DOCUMENTS

| | | |
|---|---|---|
| DE | 3312977 A1 | 4/1983 |
| GR | 1008055 B | 10/2012 |

*Primary Examiner* — Tulsidas C Patel
*Assistant Examiner* — Thomas Quigley
(74) *Attorney, Agent, or Firm* — Invention To Patent Services; Alex Hobson

(57) ABSTRACT

A wind turbine system utilizes an air deflector configured inside of an air scoop extending along a circular track around the air deflector to capture the prevailing wind and direct it up through an air rotor. The air rotor is configured with a plurality of fins in the air rotor channel and the flow of air past the fins spins the air rotor. A rotor of an electrical generator is coupled with the air rotor and spins with respect to a stator, fixed to the wind turbine frame, to produce electricity. The air scoop rotates about the wind turbine as a function of the prevailing wind and may be controlled by a controller that is coupled with one or more of the wheels of the air scoop. A plurality of baffles may be configured under the fins to direct the air and over the fins.

20 Claims, 8 Drawing Sheets

(56) References Cited

U.S. PATENT DOCUMENTS

| | | | |
|---|---|---|---|
| 5,852,331 A | 12/1998 | Giorgini | |
| 6,215,199 B1* | 4/2001 | Lysenko | F03D 1/04 290/44 |
| 8,013,465 B2* | 9/2011 | Gilbert | F03D 1/04 290/55 |
| 8,759,997 B2* | 6/2014 | Gilbert | F03D 1/04 290/55 |
| 9,013,054 B1* | 4/2015 | Charnesky | F03D 1/0608 290/55 |
| 9,038,385 B1* | 5/2015 | Khim | F03G 6/045 60/641.12 |
| 9,243,604 B2* | 1/2016 | Montgomery | F03B 13/00 |
| 9,850,883 B1* | 12/2017 | Maldonado | F03G 6/045 |
| 2008/0023964 A1* | 1/2008 | Sureshan | F03D 1/04 290/55 |
| 2010/0219643 A1* | 9/2010 | Biucchi | F03D 3/0427 290/55 |
| 2011/0175366 A1* | 7/2011 | Steinlechner | F03D 1/065 290/55 |
| 2011/0204634 A1* | 8/2011 | Skala | F03D 1/04 290/44 |
| 2012/0038157 A1* | 2/2012 | Skala | F03D 1/04 290/44 |
| 2012/0301282 A1 | 11/2012 | Kim | |
| 2016/0084227 A1* | 3/2016 | Krippene | F03D 9/39 290/55 |
| 2016/0186718 A1* | 6/2016 | Allaei | F03D 1/02 415/80 |
| 2016/0186725 A1* | 6/2016 | Dofredo | F03D 9/007 60/641.12 |

* cited by examiner

WIND TURBINE SYSTEM

BACKGROUND OF THE INVENTION

Field of the Invention

The invention is directed to a wind turbine system that directs prevailing wind through an air rotor that rotates and is coupled with an electric generator rotor to produce electricity.

Background

Wind turbines having exposed blades are used to produce electrical power. Theses systems rely on a prevailing wind that is substantial enough to create rotation of the blades and often the prevailing wind is insufficient for this purpose. In addition, these spinning blade wind turbines are not visually attractive as they large exposed spinning blades. Lastly, spinning blade wind turbines are responsible for killing birds.

SUMMARY OF THE INVENTION

The invention is directed to a wind turbine system comprising an air funnel and scoop that captures the prevailing wind and direct it through a ring-shaped air rotor that spins to produce electricity. An electrical generator comprises a rotor coupled with the air rotor that spins with respect to a stator that is fixed to produce electrical power. An air capture area between an internal air funnel and an outer air scoop is reduced toward the top of the wind turbine and this increases the pressure and speed of the airflow through the air rotor. An exemplary air funnel is an upside down cone or inverted cone shape, having a larger diameter toward the top of the wind turbine and a reduce diameter toward the base. An exemplary air funnel tapers in diameter from the top of the wind turbine to the base of the wind turbine. The air scoop is configured outside of the air funnel and extends about 180 degrees around the air funnel. An exemplary air scoop is configured to rotate about the funnel, such as on track or rail as the direction of the prevailing wind changes. Airflow is captured between the air funnel and air scoop and is directed up through a plurality of fins of the air rotor to create a force on the fins that rotates the air rotor. The angle of the fins with respect to the airflow may be controlled depending on the pressure or velocity of the airflow and may be turned substantially vertically if the airflow exceeds an upper threshold, for safety. An exemplary air rotor rotates on an air rotor track and the electrical rotor is coupled to the air rotor and spins with respect to the stator to produce electricity.

An exemplary air funnel comprises a plurality of air funnel supports and a cover configured in a tapering configuration from the top to the base, such as an upside-down or inverted funnel shape. The funnel cover may be made out of fabric such as a rip-stop fabric attached to the supports or may be made out of metal, such as sheets of metal attached to the supports.

An exemplary air scoop comprises a plurality of scoop supports and a cover coupled to the supports. An exemplary air scoop extends about the wind turbine or around the air funnel about 120 degrees or more, about 160 degrees or more, about 180 degrees or more, about 220 degrees or less and any range between and including the values provided. The extension of the air scoop around the air funnel should be optimized for capturing the most prevailing wind and therefor, too much extension around the wind turbine may block the prevailing wind. The air scoop cover may be made out of fabric such as a rip-stop fabric attached to the supports or may be made out of metal, such as sheets of metal attached to the supports. The supports of the air scoop may have wheels that engage with a circular track or rail to allow the air scoop to rotate with respect to the prevailing wind. A scoop motor may be coupled to one or more of the wheels to drive the air scoop on the track. An air direction sensor may be configured to sense the direction of the prevailing wind and may be coupled with a controller to activate the scoop motor(s) to move the air scoop accordingly.

The air rotor is configured between the top of the air funnel and the air scoop, such as outside of the outer perimeter of the air funnel and within the inside perimeter of the air scoop, or in the ring-shaped space between the top of the air funnel and scoop, an annular space therebetween. The air rotor rotates on an air rotor track, such as a rail, by air rotor wheels. The air rotor is ring shaped and has a plurality of fins. The fins may be configured at an offset angle to vertical to create a rotating force as the air flows through the air rotor. The fins may be planar sheets of metal and the offset angle may be changed by rotating the fins about a fin arm that extends across the fins an outer coupling to an inner coupling. An exemplary fin may be airfoil shaped having on side that is curved and the opposing side substantially flat to produce a force on the fin as air flows thereover. A fin actuator, such as a fin motor, may be coupled with a fin linkage, such as a cable, and the fin actuator may move the fin linkage to rotate the fins and change the offset angle of the fin. The fin actuator may be operated remotely by the controller and may be coupled to the air rotor and spin with the air rotor. A fin actuator may be battery powered to eliminate the complication of providing power to a spinning device. A fin may be configured about the air rotor every few degrees or more, about every 5 degrees or more, about every 10 degrees or more, about every 15 degrees of more, about every 30 degrees or more and any range between and including the values provided. An exemplary fin may be slightly more narrow at the top and bottom to allow for rotation within the ring of the air rotor. An air rotor channel is formed between an inside panel and an outside panel of the air rotor, to receive and direct the flow of air over the fins.

A plurality of baffles may be configured under the air rotor and particularly under the air rotor channel to direct the airflow into the fins. The baffles may be curved to direct the air into the fins to maximize the rotational force of the fins.

The electric generator is coupled with the air rotor, wherein the rotor spins or rotates with the air rotor about a rotational axis, a line extending vertically through the center of the wind turbine or the center of the circular air rotor. The electrical rotor may be inside, or closer to the rotation axis, than the air rotor, or configured outside of the air rotor. The electrical generator comprises a rotor and a stator and may be a direct generator, transverse flux generator, or axial flux generator, and the like. A transverse flux generator includes a commutated flux generator, for the purposed of this invention. A transverse flux as well as axial-gap generators may be preferred types of generators as they can produce large amounts of power and are efficient at low speeds, or revolutions per minute of the rotor. A transverse flux generator produces magnetic flux that moves transverse to the rotational plane of the stator. A transverse flux may have an axial gap or radial gap as detailed herein and may be cavity engaged, wherein the rotor extends into the stator, or face engaged, wherein there is a gap between the faces of the rotor and stator. In addition, the magnets and flux concentrators to produces the flux switches may be on the rotor or the stator. Transverse flux machines and commutated flux machines, both referred herein as transverse flux machines or generators, are described in U.S. Pat. No. 9,236,773, to Electric Torque Machines, Inc.; the entirety of which is hereby incorporated herein by reference and in particular, FIGS. 1 to 4 and the associated description of these figures.

An exemplary generator is an axial flux generator. Exemplary axial flux generators and motors are described in the White Paper entitled High Efficiency Axial Flux Machines, V1.5, April 2018, Daan Moreels, Magax Inc, and U.S. patent application no. 2016/0149453A1, Yuichiro Tanaka, et al., and U.S. Pat. No. 8,791,616. Jean Marc Canini, et al.; wherein the entirety of each is hereby incorporated by reference herein.

An exemplary generator for the wind turbine of the present invention is described in U.S. patent application Ser. No. 15/450,098, filed on Mar. 6, 2017 to Bryan Prucher and currently pending. This application describes brushless permanent magnet AC or DC rotary electrical motor/generator (BLPMAC/BLPMDC) machines used to convert a rotational mechanical power input into an electrical power output. More particularly, the application describes modular BLPMAC/BLPMDC generators for use in direct drive applications. The application also describes modular BLPMAC/BLPMDC motor/generators comprising individual modular segments for manufacturing with wind turbines. The entirety of this application is hereby incorporated by reference herein and particular reference is made to the figures showing the stator configuration of the coil encircling a stack of magnetically permeable material and the rotor, a magnet module with magnets on opposing sides of a U-shaped module. These modular segments may be configured around the air rotor either around the outside or inside of the air rotor to produce a modular generator.

An exemplary wind turbine system of the present invention may be large in scale, wherein the air rotor diameter is about 5 m or more, about 10 m or more, about 20 m or more, about 30 m or more, about 50 m or more and any range between and including the diameter values provided. The height of the wind turbine may be large to ensure enough wind is captured to drive the air rotor and subsequently the generator and may about 5 m or more, about 10 m or more, about 20 m or more, about 30 m or more, about 50 m or more and any range between and including the height values provided. An exemplary wind turbine system may be large to enable large amounts of electrical power generation, such as at least 0.5 MegaWatt (Mwatt), or at least 1.0 Mwatt. or at least about 5 Mwatts.

An exemplary wind turbine system of the present invention may produce large amounts of electrical power, such as at least about 5 Mega watts (Mwatts) or more, about 10 Mwatts or more, about 20 Mwatts or more, about 50 Mwatter or more and any range between and including the power values provided. The wind turbine system of the present invention is directed to high power generation and therefore large air capture is required and large diameter rotors are required.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
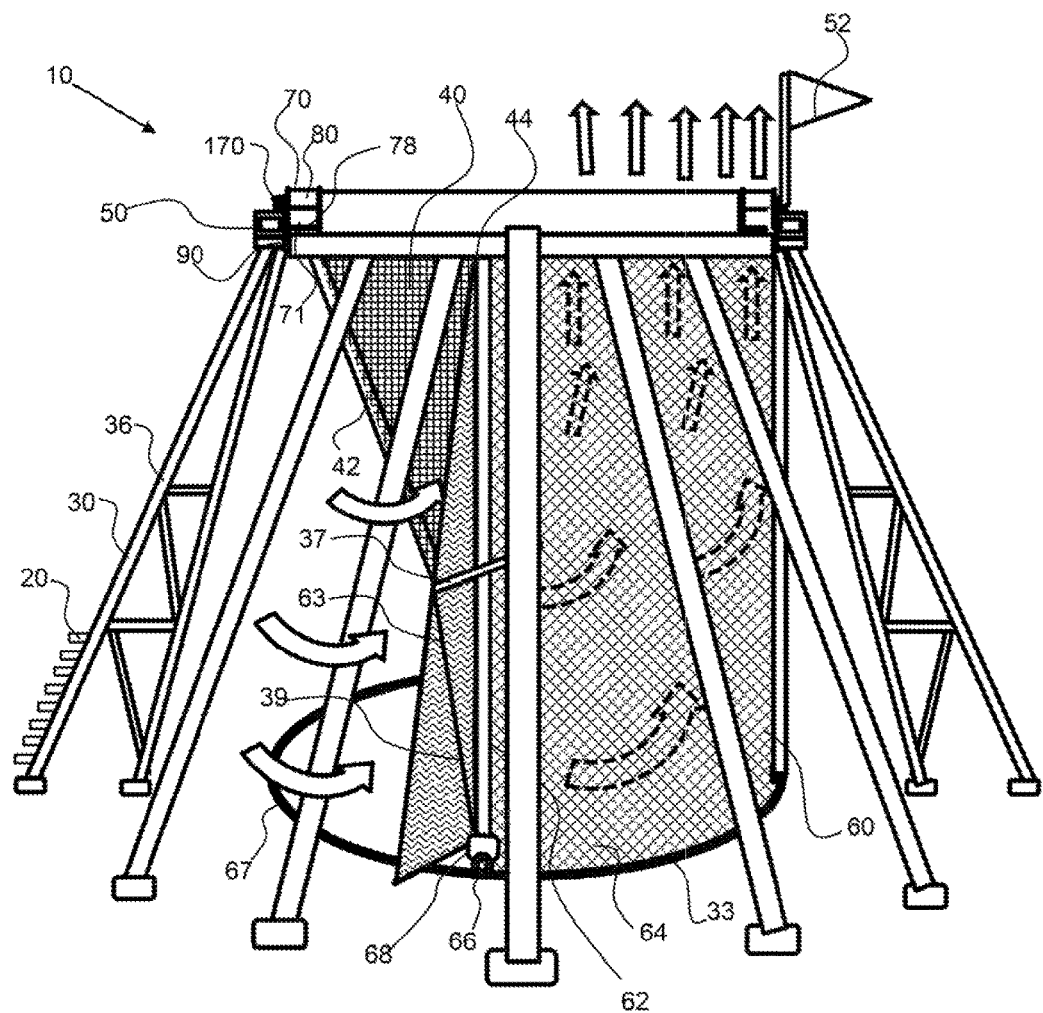
FIG. 1 shows a side view of an exemplary wind turbine comprising an air funnel configured inside of an air scoop and a generator coupled to an air rotor that is spun by air moving up between the air funnel and the air scoop and through fins that propel the air rotor.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
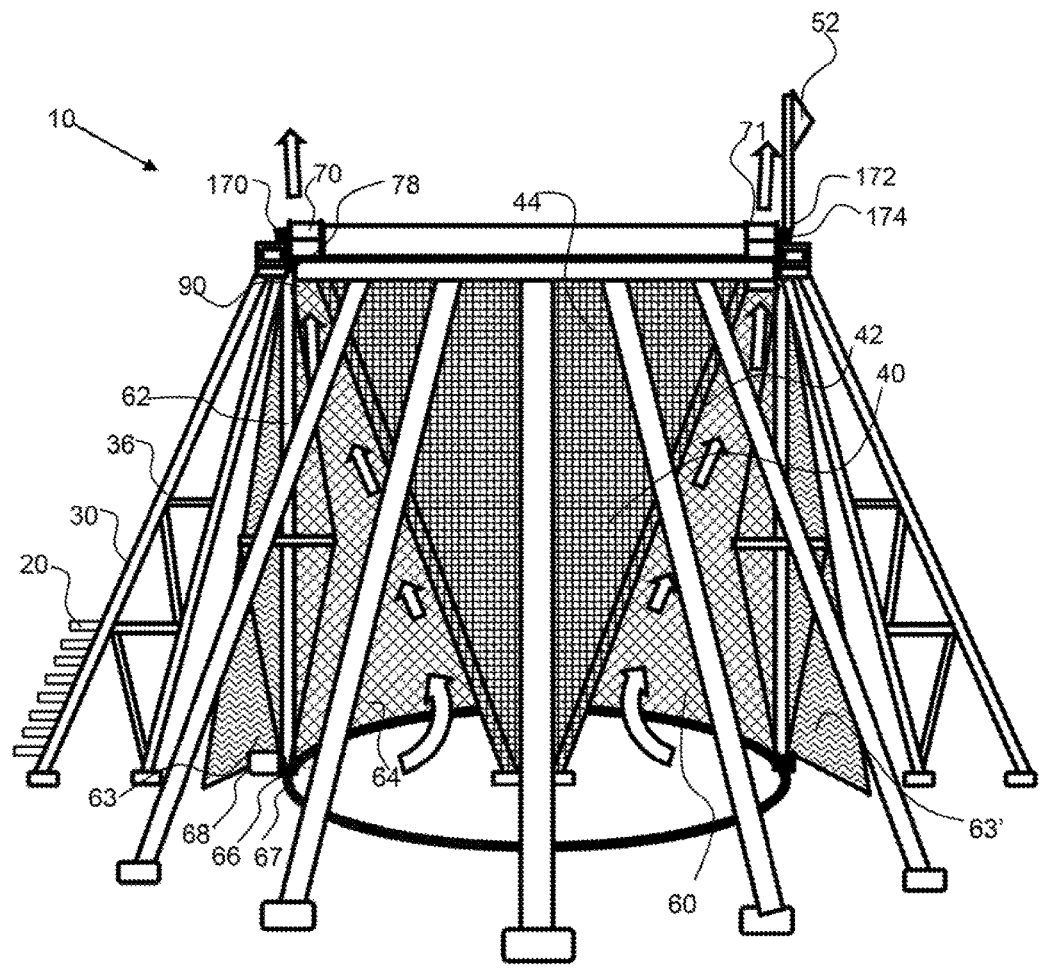
FIG. 2 shows a front view of an exemplary wind turbine comprising an air funnel configured inside of an air scoop and a generator coupled to an air rotor that is spun by air moving up between the air funnel and the air scoop and through fins that propel the air rotor.
Figure 3:
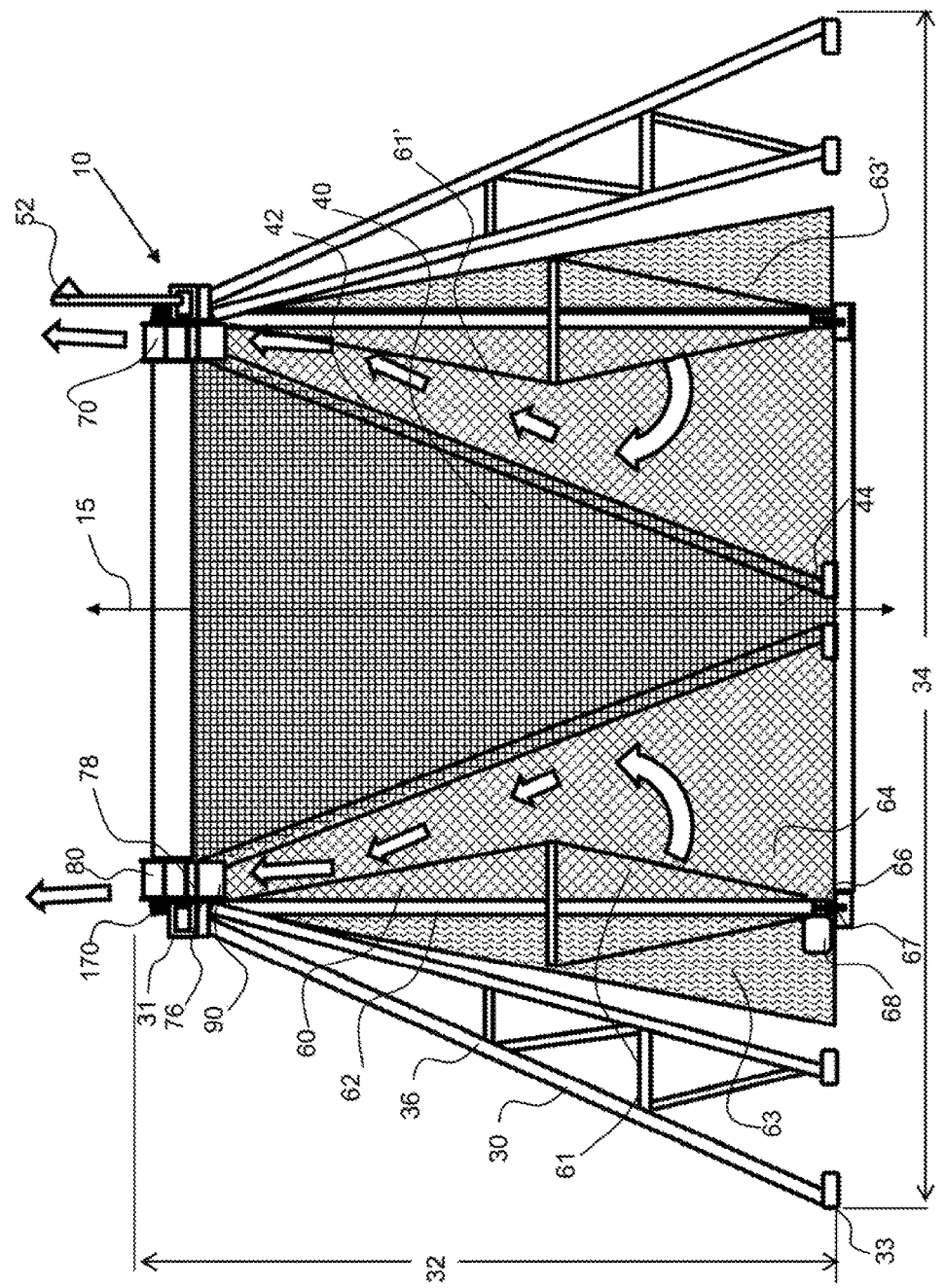
FIG. 3 shows a vertical cross-sectional view of an exemplary wind turbine comprising an air funnel configured inside of an air scoop.

Referring to FIGS. 1 to 3, an exemplary wind turbine 10 comprises an air funnel 40 configured inside of an air scoop 60 and an electrical generator 170 coupled to an air rotor 70. The air rotor and electrical generator rotor attached thereto are spun by air moving up between the air funnel and the air scoop and into the air rotor channel 71. In the air rotor channel, the air flows through, or over, fins 80 that propel the air rotor. Air, as indicated by the large arrows, enters the wind turbine between the air funnel 40 and the air scoop 60 and is directed up through the air rotor channel 71 of the air rotor 70. Air passes through a plurality of baffles 90 that direct the air into the air rotor section. The air pushes the fins 80 and this spins the air rotor about the rotational axis 15, extending vertically up from a center of the air rotor. The air rotor is coupled with an electrical rotor 172 and as the air rotor rotates, the electrical rotor moves with respect to a stator 174 to produce electrical power. The electrical rotor and stator are shown on the outside of the air rotor but may also be configured on the inside of the air rotor.

The air scoop 60 comprises a scoop cover 64, which may be a fabric or metal that is supported by the air scoop supports 62. The air scoop may extend about 180 degrees about the wind turbine and is configured on a scoop track 67 to allow the air scoop to rotate as required to capture the prevailing wind as it changes direction. A scoop motor 68 is configured to drive the air scoop wheel 66 that is engaged with the scoop track 67. An air direction sensor 52 may be used to determine wind direction and the air scoop may be moved automatically by the control system. An air direction sensor 52 may be configured to sense the direction of the prevailing wind and may be coupled with a controller 50 to activate the scoop motor(s) 68 to move the air scoop 60 accordingly. The air funnel is supported by a plurality of air funnel supports 42, and an air funnel cover 44 is made of fabric or metal to produce the air funnel shape that deflects air into the air scoop. The air funnel 40 tapers from the top to the base and may be an inverted funnel shape, wherein the large portion of the funnel is proximal or at the top of the air funnel and the air funnel diameter reduces toward the base 33. The air or prevailing wind is captured between the scoop and the funnel and the air capture area 61, 61' is reduced as the air is forced upward toward the air rotor channel 71, or into the air rotor, 70 as shown in FIG. 3. This reduction in cross-sectional area between the scoop and the funnel increases the pressure of the air and the speed of the air which enhances the force on the fins. An exemplary air scoop support 62 comprises a cross-support member 37 that extends orthogonally to the length of the air scoop support and tension members 39, such as rods or cables, connected to the cross-support member and extending to the ends of the air scoop support member. This tensioning arrangement increases the strength of the air scoop support and prevents deflection. The prevailing wind may produce a lot of deflection forces on the air scoop support and a tensioning arrangement as described may be required. A pair of scoop flanges 63 may extend from the extended ends of the air scoop to direct more air into the air scoop. The scoop flanges may extend out from the end of the air scoop at a flange angle outward from a direction tangent with the scoop track or the end of the scoop. The scoop flange may extend out as much as 90 degrees or less, about 60 degrees or less or about 45 degrees or less. The scoop flange may extend out further along the bottom and narrow as it extends up. The scoop flange may be coupled to the air scoop supports 62 on either end of the air scoop and may be coupled to a cross-support member 37.

Figure 4:
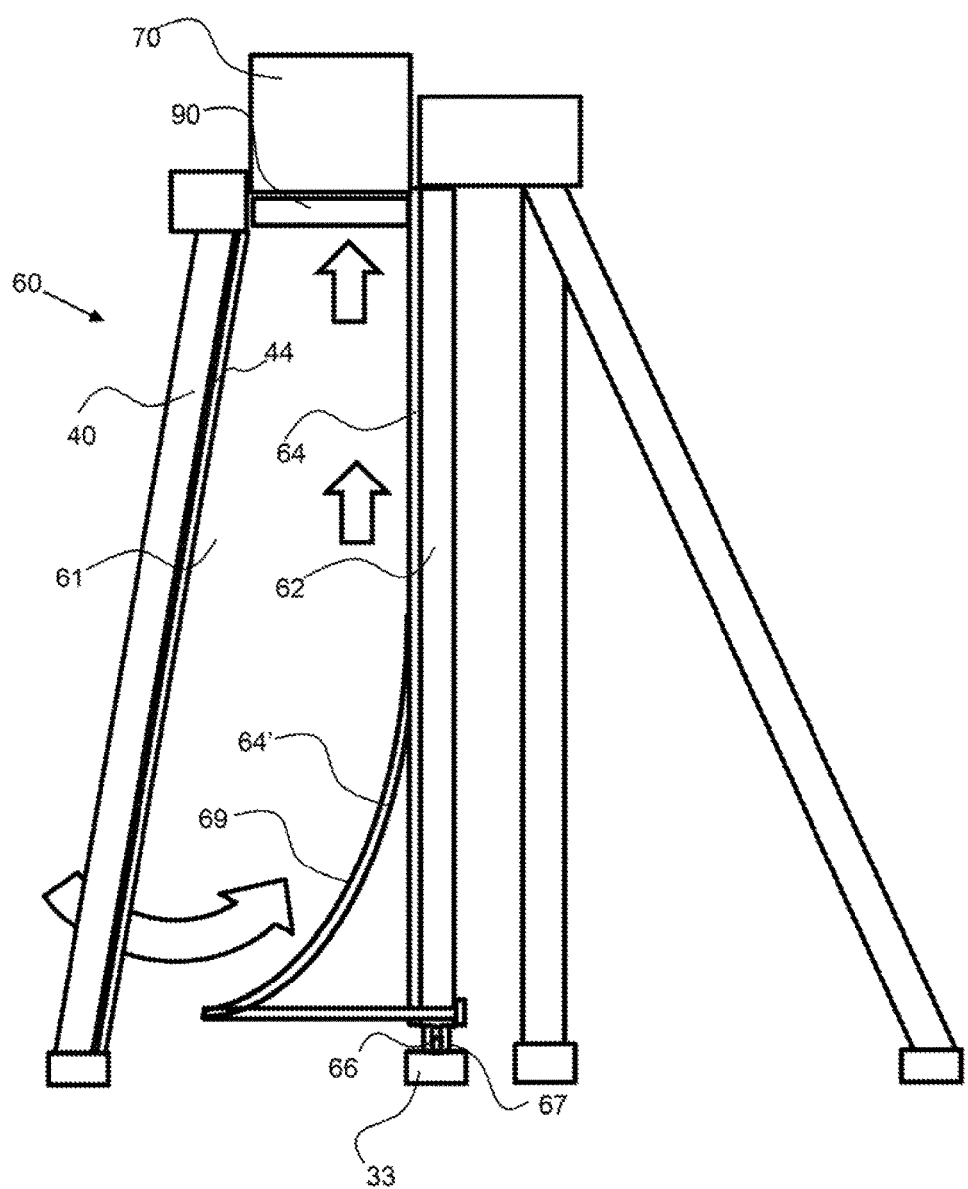
FIG. 4 shows a portion of an exemplary wind turbine and particularly the air scoop support cover 64 deflecting wind up and into the air capture area.

As shown in FIG. 4, the bottom portion of the air scoop 60 may comprise an air scoop deflector 69 that deflects the wind upward toward the air rotor. The air scoop deflector may extend about one quarter the length of the air scoop support 62 from the base, or about a quarter of the length of the air scoop, or about one half the length of the air scoop. The air scoop deflector may be at an offset angle to the length of the air scoop support or may be curved or extend along a radius from a base end to the end coupled to the air scoop support up along the length, where the air scoop deflector may be tangent with the vertical air scoop support.

The wind turbine comprises a frame 30 having a plurality of frame supports 36. The frame secures the air funnel and also provides support for the air rotor. As shown in FIG. 3, the air rotor 70 spins on an air rotor track 78 and has a plurality of air rotor wheels 76 that engage with the air rotor track. Also shown in FIG. 3, are the fins 80 and the baffles 90. The baffles are configured under the fins of the air rotor and are stationary whereas the fins of the air rotor rotate with the air rotor 70. Also shown in FIG. 3 is the height 32 of the wind turbine from the top 31 to the base 33, and width 34 or diameter of the wind turbine 10. The base of the wind turbine may be secured to the ground or earth or some other support structure and the rotational axis 15 may extend vertically from the base. As described herein, the wind turbine may be tall having a height of 10 m or more, or 20 m or more and even 30 m or more.

Figure 5:
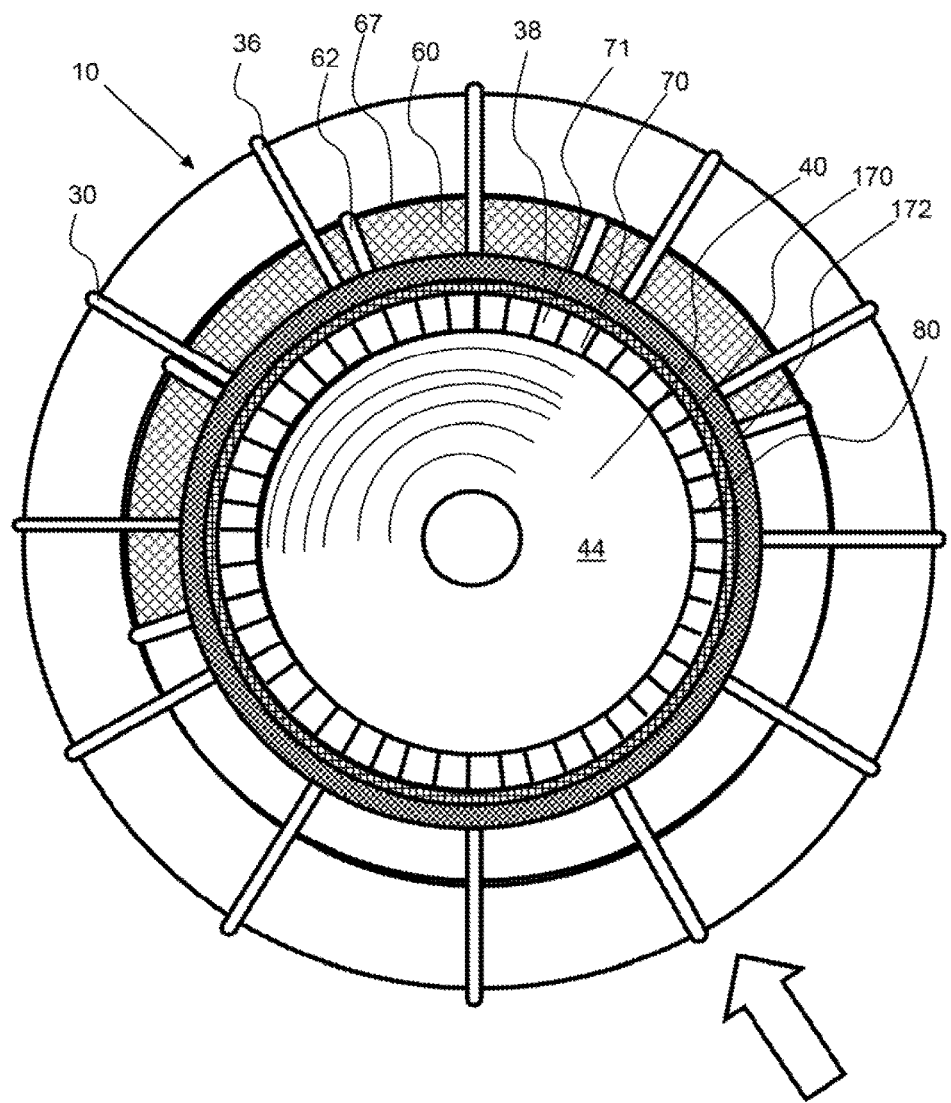
FIG. 5 shows a top view of an exemplary wind turbine comprising an air rotor that is spun by air moving past fins and that is coupled with an electrical generator to produce electrical power.

As shown in FIG. 5, an exemplary wind turbine 10 comprises an air rotor 70 that is spun by air moving past fins 80. The air rotor is coupled with an electrical generator 170 to produce electrical power. As shown in FIG. 4, the air funnel 40 has an inverted shape, wherein the funnel has a reduced cross-sectional area toward the base. Conversely, the air scoop 60, may have a larger diameter at the base and a reduced diameter toward the top of the wind turbine or as it approaches the air rotor 70. The air funnel may extend vertically however, as shown in FIGS. 1 to 3, and may have an air scoop deflector along the base to direct air up into the air capture area.

Figure 6:
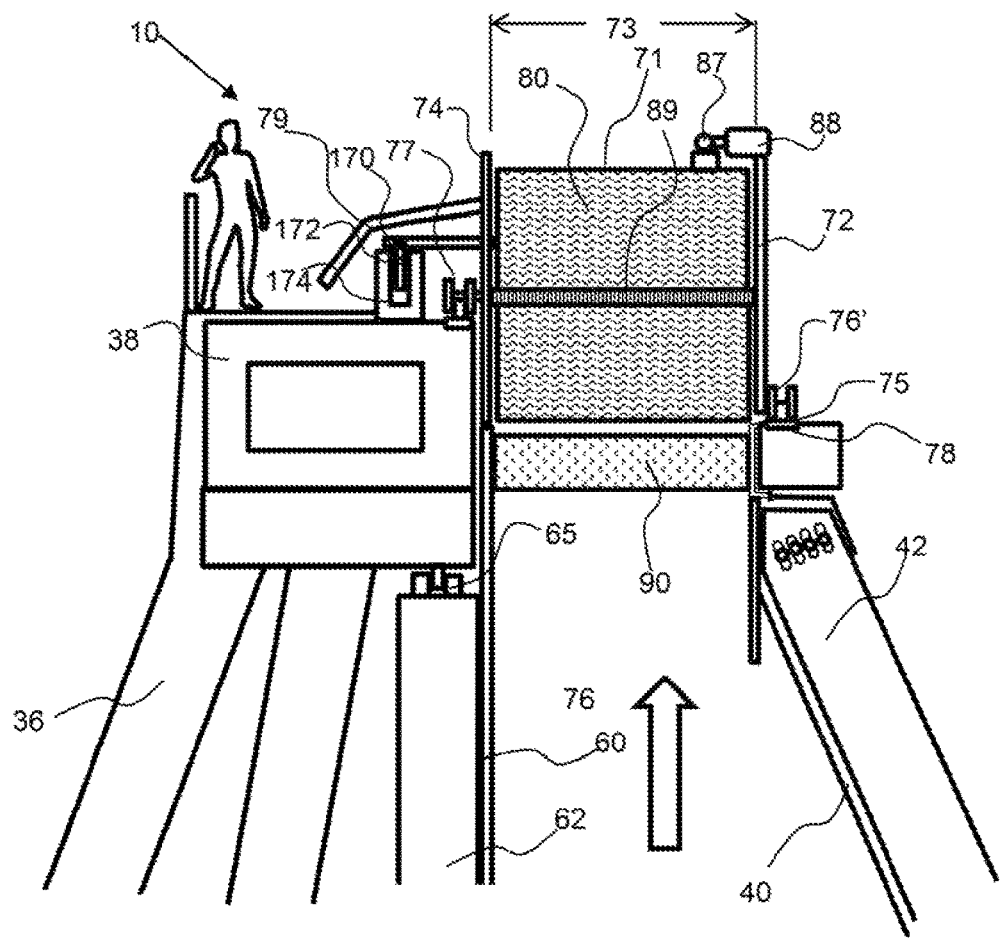
FIG. 6 shows a portion of the wind turbine system comprising an air rotor that is coupled with a generator comprising a stator and a rotor that is attached to the air rotor. As the air rotor spins, the electrical rotor is spun with respect to the stationary stator to produce electrical power.

As shown in FIG. 6 an exemplary wind turbine 10 comprises an air rotor 70 that is coupled with an electrical generator 170. The electrical generator rotor 172 is coupled with the air rotor and spins with the air rotor. The electrical generator rotor spins with respect to the stator 174 to produce electricity, or electrical power. The angle of the fins 80 may be controlled or changed by a fin actuator 88 to maximize the force to rotate the air rotor. The fin actuator may change the angle of all of the fins at one time, as they may be coupled together by a common fin linkage 87, such as a cable that is coupled with the fin, whereby when the motor retracts the cable, all of the fins change in fin angle, as each is coupled to the fin linkage. A fin arm 89 extends from the inside panel to the outside panel and bearings may enable the fin arm and fin coupled thereto to rotate to a desired fin angle. The air rotor spins on an air rotor track 78 comprising inner air rotor track 75 and an outer air rotor track 77 and may comprise wheels 76 that are engaged with an air rotor tracks that extends in a circle about the air rotor. An air rotor channel 71 is formed by an inside panel 72 and an outside panel 74, both rings, to receive and direct the airflow over the fins. The air flow channel has a width 73 and the fins are configured within this width. The fins may be slightly more narrow than the fin channel along the extended ends and/or inside edge to allow the fin to rotate to a desired fin angle without hitting the inside or outside panel. The baffles 90 are shown configured under the air rotor and fins. The airflow is directed up between the air scoop 60 and the air funnel 40 and into the baffles and subsequently through the fins of the air rotor. The fins may be controlled to allow the air to flow through the air rotor with little force on the fins when the wind conditions are too high. The fins may be turned substantially vertically, for example, to allow the air to flow more freely through the air rotor.

Figure 7:
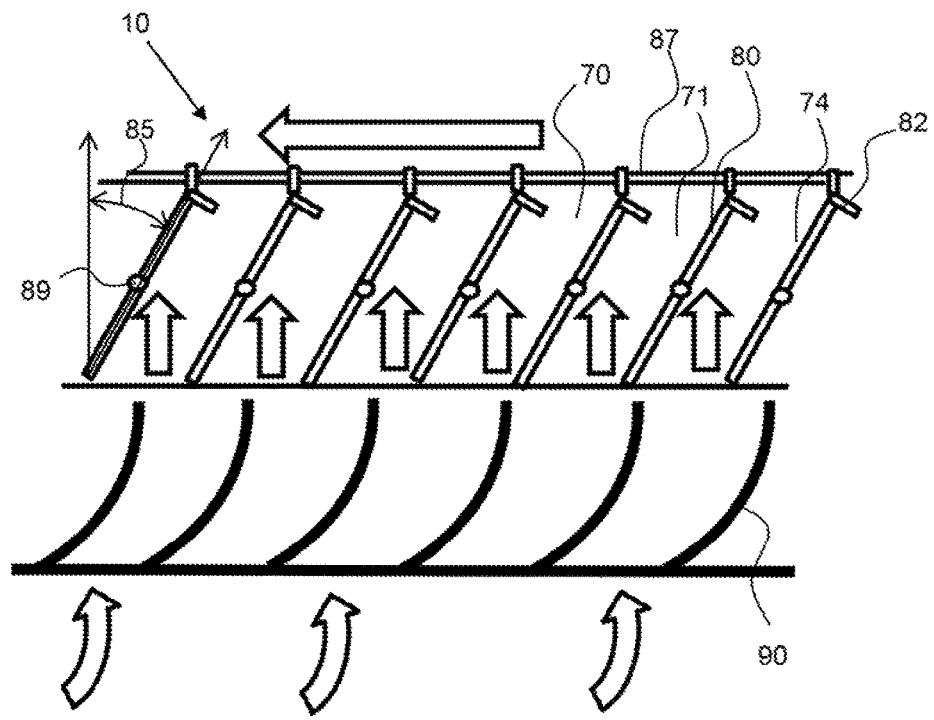
FIG. 7 shows a diagram of a portion of the air rotor comprising a plurality of fins that propel the air rotor as air moves through the air rotor and a plurality of baffles that direct air from the air scoop into the air rotor.

As shown in FIG. 7, the exemplary air rotor 70 comprises a plurality of fins 80 that propel the air rotor as airflow creates a force on the fins. In addition, a plurality of baffles 90 direct air from the air scoop into the air rotor. A fin may comprise a fin flange 82, on the upward or extended end of the fin from the entrance to the air channel 71, and this fin flange may be configured to produce more force on the fin and air rotor.

Figure 9:
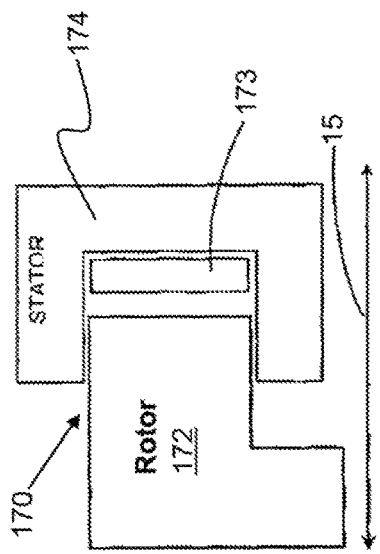
FIGS. 8 to 11 show exemplary rotor and stator configurations for the generator of the present invention.
Figure 8:
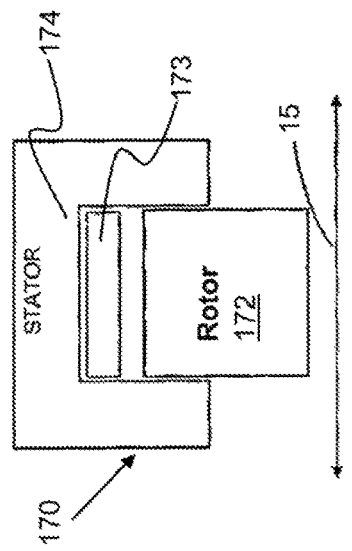
Figure 11:
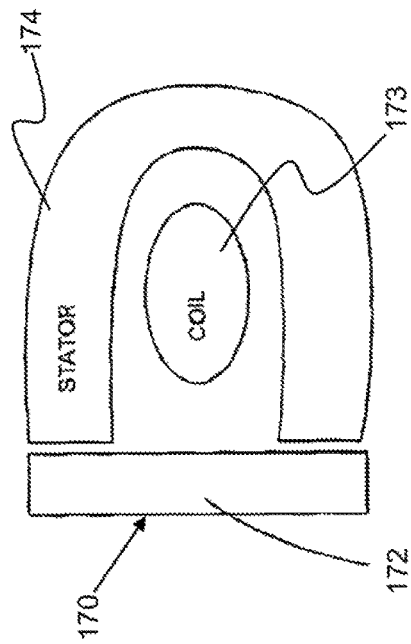
Figure 10:
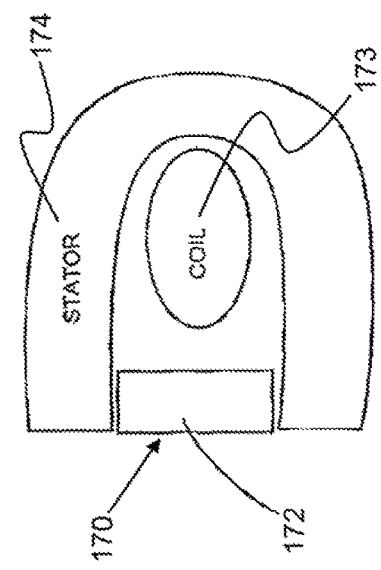

As shown in FIGS. 8 to 11, the electrical generator may be a transverse flux generator. These figures are adopted from U.S. Pat. No. 9,236,773, to Electric Torque Machines, Inc.; the entirety of which is hereby incorporated by reference herein. The generator 170 of the present invention comprises a rotor 172 and a stator 174 and may be a direct generator, transverse flux generator, or axial flux generator, and the like. A coil 173 extends within or between the rotor and stator. The transverse flux generators, also referred to in some situations as a commutated flux generator, can produce large amounts of power and are efficient at low speeds, or revolutions per minute of the rotor. A transverse flux generator produces magnetic flux that moves transverse to the rotational plane of the stator. A transverse flux may have an axial gap as shown in FIG. 8 or radial gap as shown in FIG. 9. A transverse flux may be cavity engaged, as shown in FIGS. 8 to 10, wherein the rotor extends into the stator, or face engaged as shown in FIG. 11, wherein there is a gap between the faces of the rotor and stator. In addition, the magnets and flux concentrators to produces the flux switches may be on the rotor or the stator.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A wind turbine system comprising:
a) a top;
b) a base;
c) a frame to support the wind turbine;
d) an air rotor that is ring shaped about a central rotational axis and comprises:
a plurality of fins configured at a fin angle to spin the air rotor with a flow of air through said air rotor;
an air rotor channel to direct the flow of air over the plurality of fins;
e) an air scoop that extends around a portion of the wind turbine and extends down from the air rotor to the base; wherein the air scoop is configured to move about a circular scoop track with respect to a prevailing wind direction;
f) an air funnel configured inside of the air scoop and extending down from the air rotor channel to produce an air capture area between said air funnel and the air scoop;
wherein the air funnel tapers from the top to the base and has a smaller cross-sectional area at the base and larger cross-sectional area proximal the air rotor;
wherein the air capture area is reduced in area as it approaches the air rotor channel;
g) an electrical generator comprising:
i) a stator coupled to the frame; and
ii) a rotor coupled with the air rotor;
wherein the electrical generator extends in a ring around a rotational axis of the air rotor;
whereby said wind turbine system produces electrical power when said prevailing wind is directed between the air scoop and the air funnel and up through the plurality of fins of the air rotor to spin the air rotor and the electrical generator rotor with respect to the stator to produce electrical power.

2. The wind turbine system of claim 1, wherein the air rotor comprises a plurality of wheels and a circular air rotor track coupled to the frame, wherein said wheels engaged with said air rotor track to enable the air rotor to spin.

3. The wind turbine system of claim 2, wherein the air rotor comprises an inner air rotor track coupled to the frame, and an outer air rotor track, and a plurality of wheels for engagement with each of said air rotor tracks to enable the air rotor to spin.

4. The wind turbine system of claim 1, wherein the air rotor comprises a fin linkage coupled to each of the plurality of fins and a fin actuator coupled to the fin linkage to move the fin linkage and each of said plurality of fins to change said fin angle.

5. The wind turbine system of claim 1, wherein the air scoop extends at least 180 degrees about the wind turbine from a first end to an opposing second end.

6. The wind turbine system of claim 5, wherein the air scoop comprises an air scoop flange that extends from each of the first and second ends at a flange angle to capture more of the prevailing wind and direct it into the air capture area between the air scoop and the air funnel deflector.

7. The wind turbine system of claim 5, wherein the air scoop comprises an air scoop deflector that extends from the air scoop, proximal the base and inward toward the rotational axis to an extended end to direct the prevailing wind upward into the air capture area between the air scoop and the air funnel deflector.

8. The wind turbine system of claim 7, wherein the air scoop deflector extends along a curve from said extended end to the air scoop deflector.

9. The wind turbine system of claim 1, wherein the air scoop comprises an air scoop motor that is coupled with an air scoop wheel to move the air scoop around the circular air scoop track.

10. The wind turbine system of claim 9, further comprising a wind direction sensor to measure a direction of the prevailing wind and a controller that is coupled with the air scoop wheel and that receives the direction of the prevailing wind from the wind direction sensor; wherein the controller changes the air scoop position on the air scoop track with respect to direction of the prevailing wind.

11. The wind turbine system of claim 1, wherein the air scoop comprises an air scoop cover that is a fabric.

12. The wind turbine system of claim 1, wherein the funnel comprises an air funnel cover that is a fabric.

13. The wind turbine system of claim 1, wherein the air capture zone has a cross-sectional area that reduces vertically toward the air rotor.

14. The wind turbine system of claim 1, further comprising a plurality of air baffles configured under the fins to direct air into the air rotor and over the fins.

15. The wind turbine system of claim 1, wherein the stator extends in a circle around the outside of the air rotor.

16. The wind turbine system of claim 1, wherein the electrical generator is a transverse flux electrical generator.

17. The wind turbine system of claim 1, wherein the wind turbine has a diameter of at least 20 meters and a height of at least 20 meters.

18. A wind turbine system comprising:
 a) a top;
 b) a base;
 c) a frame to support the wind turbine;
 d) an air rotor that is ring shaped and comprises:
  a plurality of fins configured at a fin angle to spin the air rotor with a flow of air through said air rotor;
  an air rotor channel to direct the flow of air over the plurality of fins;
  a fin linkage and a fin actuator coupled to the fin linkage to move said fin linkage;
  wherein each of plurality of fins are coupled to the fin linkage and wherein the fin actuator change said fin angle by moving the fin linkage;
 e) an air scoop that extends around a portion of the wind turbine and extends down from the air rotor to the base;
  wherein the air scoop comprises:
   an air scoop motor;
   a circular air scoop track;
   an air scoop wheel;
   where the air scoop motor is coupled with the air scoop wheel to move the air scoop around the circular air scoop track with respect to a prevailing wind direction;
 f) an air funnel configured inside of the air scoop and extending down from the air rotor channel to produce an air capture area between said air funnel and the air scoop;
  wherein the air funnel tapers from the top to the base and has a smaller cross-sectional area at the base and larger cross-sectional area proximal the air rotor; and
  wherein the air capture area is reduced in area as it approaches the air rotor channel;
 g) a wind direction sensor to measure a direction of the prevailing wind and a controller that is coupled with the air scoop wheel;
  wherein the controller receives the direction of the prevailing wind from the wind direction sensor, and
  wherein the controller changes the air scoop position on the air scoop track with respect to direction of the prevailing wind;
 h) an electrical generator comprising:
  i) a stator coupled to the frame; and
  ii) a rotor coupled with the air rotor;
  wherein the stator and rotor extend in a ring;
 whereby said wind turbine system produces electrical power when said prevailing wind is directed between the air scoop and the air funnel up through the plurality of fins of the air rotor to spin the air rotor and the rotor with respect to the stator to produce electrical power.

19. The wind turbine system of claim 18, wherein the electrical generator is a transverse flux electrical generator.

20. The wind turbine system of claim 18, wherein the wind turbine has a diameter of at least 20 meters and a height of at least 20 meters.

* * * * *